(12) United States Patent
Doll et al.

(10) Patent No.: US 10,899,200 B2
(45) Date of Patent: Jan. 26, 2021

(54) OUTLET DEVICE

(71) Applicant: Faurecia Innenraum Systeme GmbH, Hagenbach (DE)

(72) Inventors: Volker Doll, Ranschbach (DE); Stéphane Londiche, Montmagny (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 712 days.

(21) Appl. No.: 15/394,145

(22) Filed: Dec. 29, 2016

(65) Prior Publication Data

US 2017/0190242 A1 Jul. 6, 2017

(30) Foreign Application Priority Data

Dec. 30, 2015 (DE) ......................... 10 2015 017 009

(51) Int. Cl.
*B60H 1/34* (2006.01)
*B60H 1/00* (2006.01)

(52) U.S. Cl.
CPC ......... *B60H 1/3421* (2013.01); *B60H 1/3428* (2013.01); *B60H 1/0065* (2013.01); *B60H 1/3414* (2013.01)

(58) Field of Classification Search
CPC ... B60H 1/3421; B60H 1/3414; B60H 1/0065
USPC ........................................ 454/155, 154, 264
See application file for complete search history.

(56) References Cited

U.S. PATENT DOCUMENTS

| | | | | |
|---|---|---|---|---|
| 4,006,673 A * | 2/1977 | Meyer | ............... | B60H 1/3442 454/154 |
| 5,733,189 A * | 3/1998 | Eastwood | ............ | B60H 1/3442 454/155 |
| 6,131,336 A * | 10/2000 | Krause | ................ | B60H 1/3414 49/74.1 |
| 6,533,655 B2 * | 3/2003 | Demerath | ............ | B60H 1/3421 454/155 |
| 6,780,098 B2 * | 8/2004 | Nishida | ................ | B60H 1/3414 454/155 |

(Continued)

FOREIGN PATENT DOCUMENTS

DE 102007019602 B3 6/2008
DE 102013210055 B3 9/2014

(Continued)

OTHER PUBLICATIONS

German Office Action in German with English translation for DE application No. 102015017009.0, dated Aug. 3, 2017, 8 pages.

*Primary Examiner* — Steven B McAllister
*Assistant Examiner* — Frances F. Hamilton
(74) *Attorney, Agent, or Firm* — Reising Ethington P.C.

(57) ABSTRACT

An outlet device for ventilation of a vehicle interior has a housing which extends between an air inlet orifice and an air outlet orifice and a pivot bearing device mounted on the housing, wherein the pivot bearing device provides a rotational axis. The outlet device further comprises a rotatable displacement body, a first vane which extends in a direction across the rotational axis, a second vane which extends in a direction across the rotational axis and contrary to the extension of the first vane, a rudder, and an adjustment device. The adjustment device permits pivoting of the rudder around an axis that is parallel to the direction of extension of the first and second vanes.

12 Claims, 5 Drawing Sheets

(56) References Cited

U.S. PATENT DOCUMENTS

| | | | | |
|---|---|---|---|---|
| 9,163,848 B2* | 10/2015 | Doll | ................ | F24F 13/072 |
| 9,278,607 B2* | 3/2016 | Zalan | ................ | B60H 1/3421 |
| 9,481,224 B2* | 11/2016 | Brinas | ................ | B60H 1/34 |
| 9,878,596 B2* | 1/2018 | Ross | ................ | B60H 1/34 |
| 10,054,332 B2* | 8/2018 | Suzuki | ................ | B60H 1/3421 |
| 10,099,536 B2* | 10/2018 | Albin | ................ | B60H 1/3421 |
| 10,112,459 B2* | 10/2018 | Inagaki | ................ | B60H 1/3428 |
| 10,317,107 B2* | 6/2019 | Nemoto | ................ | F24F 13/06 |
| 2004/0152412 A1* | 8/2004 | Gehring | ................ | B60H 1/3414 |
| | | | | 454/153 |
| 2008/0014855 A1* | 1/2008 | Leserre | ................ | B60H 1/3414 |
| | | | | 454/155 |
| 2014/0230942 A1* | 8/2014 | Takai | ................ | B60H 1/345 |
| | | | | 138/45 |
| 2014/0357178 A1 | 12/2014 | Doll et al. | | |
| 2014/0357179 A1 | 12/2014 | Londiche et al. | | |
| 2015/0336445 A1* | 11/2015 | Uehara | ................ | B60H 1/3442 |
| | | | | 454/155 |
| 2016/0200178 A1* | 7/2016 | Londiche | ................ | C22C 38/06 |
| | | | | 454/154 |
| 2016/0250909 A1* | 9/2016 | Schneider | ................ | B60H 1/3421 |
| | | | | 454/155 |
| 2016/0361978 A1* | 12/2016 | Groschopf | ................ | B60H 1/3428 |
| 2018/0056756 A1* | 3/2018 | Schaal | ................ | B60H 1/3414 |

FOREIGN PATENT DOCUMENTS

| | | | | |
|---|---|---|---|---|
| EP | 2139710 B1 | 11/2010 | | |
| FR | 2886382 A1 * | 12/2006 | ................ | F24F 13/065 |

* cited by examiner

OUTLET DEVICE

TECHNICAL FIELD

The invention relates to an outlet device for ventilation of air in a vehicle interior.

BACKGROUND

From US 2014/0357178 A1 an air vent is known.

SUMMARY

It is an object of the invention to provide an outlet device for ventilation of air in a vehicle interior, which is formed by a relatively simple construction and which allows different designs.

This and other objects are met by the characteristics of the independent claims. Further embodiments are stated in the related subordinate claims.

According to an embodiment of the invention there is provided an outlet device for ventilation of a vehicle interior. The outlet device comprises a housing, an actuation device and a guiding device for guiding the actuation device or a sleeve device thereof at the housing across the direction of the housing axis of the housing, when the valve plate is in an opening position.

According to another embodiment of the invention, an outlet device for ventilation of a vehicle interior by generating an outlet flow is provided, the outlet device comprising:
- a housing with an inner surface forming an outlet section which extends in an axial direction between an air inlet orifice and an air outlet orifice lying contrary to the air inlet orifice,
- a central body guiding device which provides a pivot bearing of the central body with a rotational axis extending along the axial direction,
- an adjustment device coupled to the rudder for pivoting the rudder around the rudder adjustment axis, wherein the central body, the first vane and the second vane divide the outlet flow channel into two opposing channel sections directing towards a common intersection point which lies outside the housing.

In an embodiment of the outlet device according to the invention,
- each of outer ends of the first and second vane contact the axial surrounding section,
- the central body guiding device comprises a first formation at an outer end of the first vane, a second formation at an outer end of the second vane and a surrounding formation formed of the axial surrounding section, wherein the first formation and the second formation each contact with the surrounding formation thereby providing a pivot bearing of the central body with a rotational axis.

In an embodiment of the outlet device according to the invention, the central body guiding device comprises a pivot bearing device of the central body which is mounted on the housing and being located within the channel, wherein the pivot bearing device provides a rotational axis extending through the housing from the air inlet orifice to the air outlet orifice.

In an embodiment of the outlet device with a pivot bearing device of the central body which is mounted on the housing, the first vane and the second vane each can extend towards the inner surface with leaving a gap between the outer end of the first vane or the second vane and the inner surface which has a width which is smaller than one eighth of the largest diameter of the housing.

In an embodiment of the outlet device according to the invention, the handle device of the adjustment device comprises:
- a first adjustment part rotatably mounted to the central body by a first pivot bearing at the first end section thereof, the first adjustment part comprising the rudder extending from the first pivot bearing towards the air inlet orifice and a first coupling lever extending towards the outer end of the displacement body facing the air outlet orifice,
- a second adjustment part rotatably mounted to the central body by a second pivot bearing at the second end section thereof, the second adjustment part comprising a handling lever extending from the second pivot bearing through an opening of the central body towards the air outlet orifice and a second coupling lever which is pivotally coupled with the first coupling lever.

In an embodiment of the outlet device according to the invention, the first vane and the second vane both comprises outer surfaces which are convex when viewed from the outside of the displacement body, wherein the surfaces of each vane are cambered contrary to each other when viewed in the direction of the extension of the vane.

In an embodiment of the outlet device according to the invention, the housing comprises an inlet section with the air inlet orifice and an outlet section which is joined to the inlet section surface and which comprises the air outlet orifice, wherein the central body is located in the outlet section and wherein the rudder extends into the inlet section.

Generally, the movement of the actuation rod can be provided manually or by a drive unit connected to the first coupling lever or second coupling lever or between the first and second coupling lever for example by a rotary actuator.

One advantage of at least some embodiments of the invention is that the outside air flow resulting from the collision of the flows is delivered by the two air channels which are separated from each other by the central body, the first vane and the second vane. The direction of the outside air flow depends on the respective air flow quantities delivered by the channel sections which is influenced by the position or attitude of the rudder in the inlet air flow. If the flows delivered by the two air channel sections equals, the resulting direction is in the middle of the outward directions of the channels. If the flow rate delivered by one channel section is lower, the resulting outside airflow has a direction closer to the other channel section outward direction.

Further advantages of the outlet device are as follows. No more plurality of fins at the outlet, neither movable surface; the external appearance of the air vent does not substantially change according the flow direction chosen, except the control knob, if present; the outlet can be cleaned easily; less mobile parts are necessary which reduce assembly cost.

Herein with the expression "along" with regard to a reference direction or a reference axis, particularly in the context with the indications of a specific direction or specific axis, generally means that the specific direction or axis deviates locally at least with a maximal angle of 45 degrees and preferably at a maximal angle of 23 degrees from the reference direction or reference axis.

Herein with the expression "across" with regard to a reference direction or a reference axis, particularly in the context with the indications of a specific direction or specific axis, generally means that the respective direction or axis deviates locally with an angle which amounts between 45 degrees and 135 degrees and preferably with an angle which amounts between 67 degrees and 113 degrees from the reference direction or reference axis.

Herein the end section of the outlet flow channel is particularly defined as having a length when projected along the housing axis which amounts to ½₀ or at least ½₀ of smallest diameter of the inner surface at the air inlet opening at the second end.

Further, herein generally the direction of end section of the outlet flow channel is the direction of the connection line of the centroids of a respective circumferential section of the cross-sections of the end section along the housing axis. Therein, the circumferential sections of the cross-sections are defined such that these lie behind each other when viewed along the housing axis and have a width in the circumferential direction which particularly amounts to ⅟₁₀ of smallest diameter of the inner surface at the air inlet opening. If this connection line is a curved line a straight line is taken for which the integral of the distances to the connection line is a minimum.

The outlet device is particularly designed such that the position of the intersection point lies in a distance from the air outlet orifice which at minimum amounts to half of the smallest diameter of the inner surface at the air outlet orifice. Further, in this combination or per se, the intersection point lies in a distance from the air outlet orifice which at maximum amounts to ten times the smallest diameter of the inner surface at the air outlet orifice.

BRIEF DESCRIPTION OF THE DRAWINGS

The foregoing and other objects and features and advantages of the present invention will be understood from the following detailed description in connection with the accompanying drawings which show.

DETAILED DESCRIPTION OF THE ILLUSTRATED EMBODIMENTS

An embodiment of the outlet device 1 for ventilation of a vehicle interior according to the invention is shown in the figures. The outlet device 1 comprises a housing device H with a housing 10 having an inner surface 10a which delimits a channel C which extends along a housing axis D1 of the housing 10. The housing 10 with the channel C forms an air inlet orifice 11 at a first axial end 11a of the housing 10 and an air outlet orifice 12 at a second axial end 12a of the housing 10 lying contrary to the air inlet orifice 11 with respect to the housing axis D1. In this regard the housing 10 comprises an inlet section 17 with an inlet section surface 17a at its inner side and an outlet section 18 with an outlet section surface 18a at its inner side which is joined to the inlet section surface 17a when viewed in the housing axis D1. The inlet section surface 17a and the outlet section surface 18a form the inner surface 10a as an outer air guide surface. The inlet section 17 forms the air inlet orifice 11 and the outlet section 18 forms the air outlet orifice 12 lying opposite to the air inlet orifice 11 with respect to the housing axis D1.

The inner surface 10a is formed rotationally symmetrical around the housing axis D1 and comprises an axial surrounding section 8a and an end section 23 of the outlet section 18 which forms the air outlet orifice 12. The end section 23 extends around the housing axis D1 in a circumferentially closed manner. The directions of opposing respective circumferential sections meet each other in an intersection point P which lies outside the housing 10 at the side of the air outlet orifice 12. In the figures two respectively opposing circumferential sections are provided with reference numerals 23a, 23b. The end section 23 is formed such that the directions of opposing circumferential sections 23a, 23b meet each other in an intersection point P which lies outside the housing 10 at the side of the air outlet orifice 12. Herein, the direction of air flow exiting the first circumferential section 23a and the direction of the air flow exiting the second circumferential section 23b are assigned the reference numerals 3a and 3b, respectively, and the streamlines of air flow exiting the first circumferential section 23a and the second circumferential section 23b are assigned the reference numerals 2a and 2b, respectively.

Generally, the outlet device 1 comprises a rotatable displacement body 30 which comprises a particularly hollow central body 34, a first vane 50 which extends from the central body 34 in a direction of extension R towards the axial surrounding section 8a, and a second vane 60 which extends from the central body 34 in a direction R' contrary to the extension of the first vane 50. The first vane, the second vane, and the central body may be construed together as a single element having the three functionalities.

Figure 1:
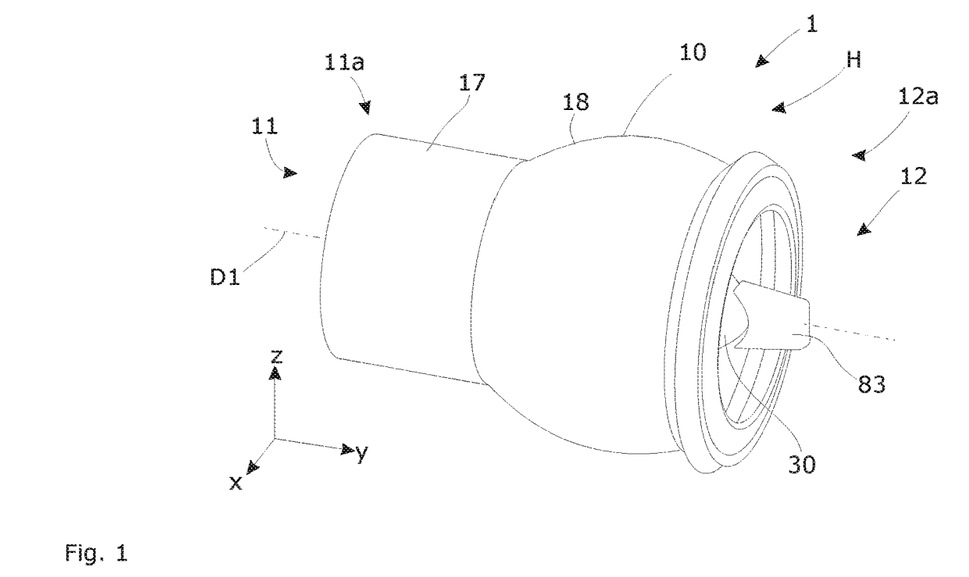
FIG. 1 a perspective view of an embodiment of the outlet device according to the invention, FIG. 2 a perspective longitudinal sectional view of an embodiment of the outlet device according to the invention, the outlet device comprising a first and a second end, FIG. 3 a sectional front view along the section plane L3-L3 of a half of the outlet device of FIG. 2, FIG. 4 a front view of a further embodiment of the outlet device which is generated by a view onto a second end of the outlet device along a housing axis, FIG. 5 a perspective longitudinal sectional view along the section plane L5-L5 of a half of the outlet device of FIG. 4, FIG. 6 a perspective longitudinal sectional view along the section plane L6-L6 of another half of the outlet device of FIG. 4, wherein the view of FIG. 6 results from a section vertically to the section of FIG. 5, FIG. 7 the outlet device of FIG. 4 in the perspective view of the same, wherein a housing of the outlet device is shown partially transparent so that a rotatable displacement body, a first vane, a second vane and a rudder is visible, FIG. 8 a sectional view of the outlet device of FIG. 4, wherein an adjustment device is in a neutral deviation state, FIG. 9 a sectional view according to FIG. 8, wherein the adjustment device is in a first deviation state, and FIG. 10 a sectional view according to FIG. 8, wherein the adjustment device is in a second deviation state.
Figure 2:
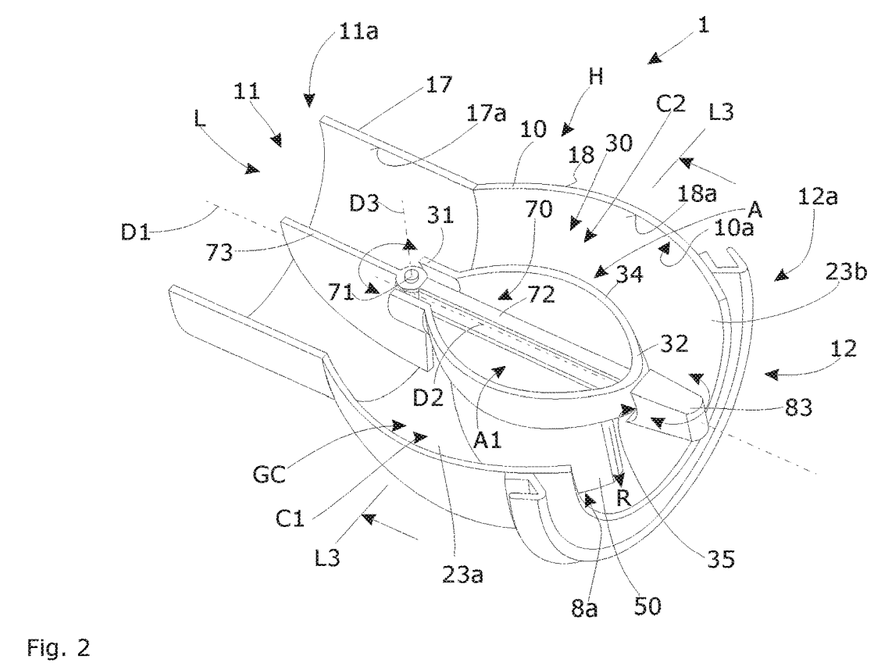
Figure 3:
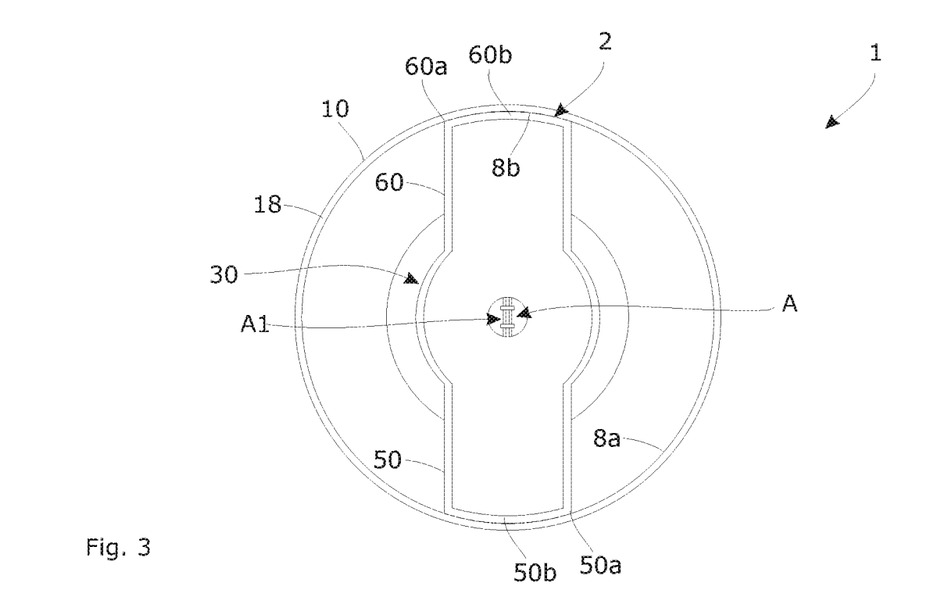
Figure 4:
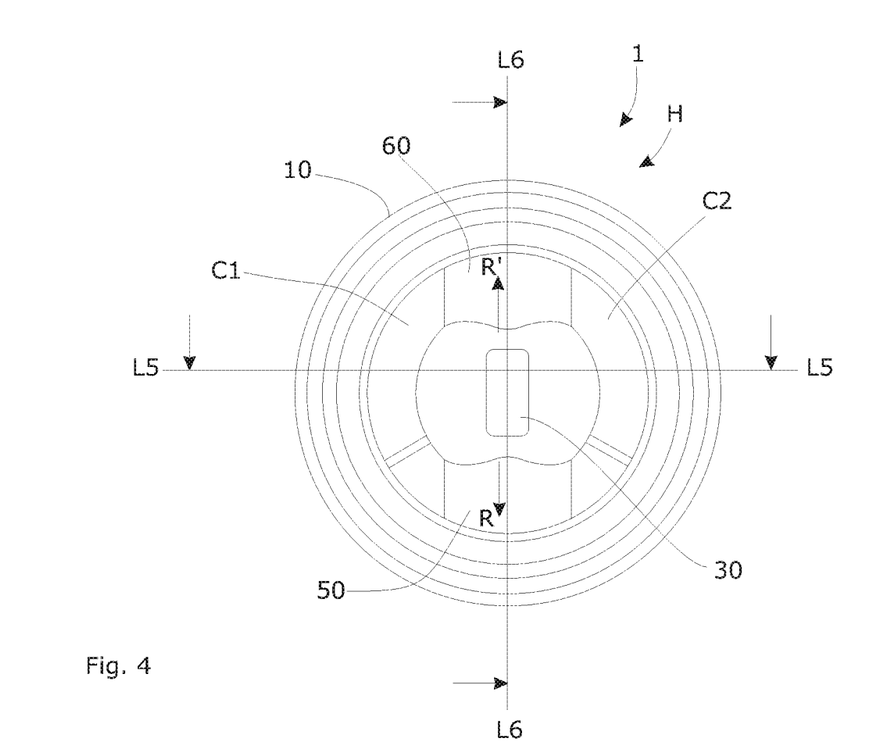
Figure 5:
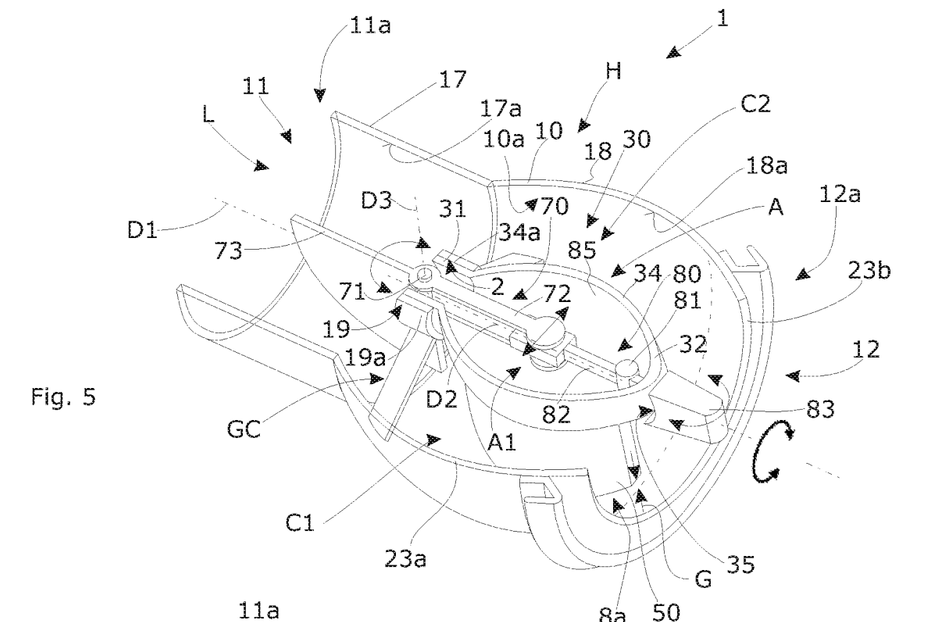

According to one embodiment of the outlet device 1, the outlet device 1 comprises a central body guiding device GC which provides a pivot bearing 2 of the central body 34 with a rotational axis D2 extending along the direction of the housing axis D1 as an axial direction, wherein each of outer ends 50a, 60a of the first and second vane 50 and 60, respectively, contact the axial surrounding section 8a. In the embodiment of FIG. 2, the formations of the outer ends 50a, 60a of the first and second vane 50, 60 and the formation of the axial surrounding section 8a provide a central body guiding device GC with a pivot bearing 2 of the central body 34 having the rotational axis D2. In detail, the central body guiding device GC comprises a first formation 50b at an outer end of the first vane 50, a second formation 60b at an outer end of the second vane 60 and a surrounding formation 8b formed of the axial surrounding section 8a, wherein the first formation 50b and the second formation 60b each contact with the surrounding formation 8b thereby providing a pivot bearing 2 of the central body 34 with a rotational axis D2. According to the embodiment of the outlet device 1 of FIG. 2, the axial surrounding section 8a has a concave shape when viewed from the central body 34 and the outer ends 50a, 60a of the first and second vane 50, 60 each have a convex shape when viewed from the central body 34. Thereby, the central body 34 is centered within the axial surrounding section 8a and stabilized in an axial position within the housing 10.

Generally, the central body guiding device GC comprises a first formation 50b at an outer end of the first vane 50, a second formation 60b at an outer end of the second vane 60 and a surrounding formation 8b formed of the axial surrounding section 8a, wherein the first formation 50b and the second formation 60b each contact with the surrounding formation 8b thereby providing a pivot bearing of the central body 34 with a rotational axis D2. The surrounding formation 8b can be a circumferentially extending protrusion of the axial surrounding section 8a and the first formation 50b and the second formation 60b can comprise a recess each of which receive the protrusion (not shown in the figures). The surrounding formation 8b can be a circumferentially extending recess of the axial surrounding section 8a and the first formation 50b and the second formation 60b can comprise a protrusion each of which extends into the recess (not shown in the figures).

The outlet device 1 further comprises a rudder 73 which is disposed at an end of the central body 34 which faces the air inlet orifice 11 and which extends toward the air inlet orifice 11 and along the first and second vane 50, 60, and which is rotationally fixed to the central body 34. Thereby, the rudder 73 may be considered part of the rotatable displacement body 30 and can be pivoted around a rudder pivot axis D3 which extends across the extension directions of the vanes.

The outlet device 1 further comprises an adjustment device A which comprises a handle device A1 which extends towards the air outlet orifice 12 and which is coupled to the rudder 73. The adjustment device A or the rudder 73 is pivoted on the central body 34, wherein a rudder pivot axis D3 is provided which is directed across the rotational axis D2.

According to a further embodiment which is shown in FIGS. 4 to 10, the central body guiding device GC comprises a pivot bearing device 19 of the central body 34 which is mounted on the housing 10 and being located within the channel C, wherein the pivot bearing device 19 provides a rotational axis D2 extending through the housing 10 from the air inlet orifice 11 to the air outlet orifice 12. The pivot bearing device 19 can particularly formed as a bearing bushing 19a which rotationally receives a rotationally symmetrical outer surface 34a of the central body 34 to form a pivot bearing 2.

The embodiment of FIG. 2 can additionally comprise the pivot bearing device 19.

Further, in the embodiment of FIGS. 4 to 9 each of outer ends 50a, 60a of the first and second vane 50, 60 need not contact the axial surrounding section 8a and so that a gap is formed between the outer ends 50a, 60a of the first and second vane 50, 60 and the axial surrounding section 8a. The width of this gap is preferably smaller than one fourth of the largest diameter of the housing 10 or the outlet section 18 of the housing 10.

In detail, the pivot bearing device 19 which is mounted on the housing 10 is located in the inner of the housing 10. The pivot bearing device 19 provides a rotational axis D2 extending through the housing 10 from the air inlet orifice 11 to the air outlet orifice 12. By the pivot bearing device 19, the central body 34 is pivoted around the rotational axis D2.

The outlet device 1 comprises an adjustment device A which can comprise a handle device A1. The adjustment device A or the handle device A1 extends towards the air outlet orifice 12 and is coupled to the rudder 73, wherein the adjustment device A or the rudder 73 is pivoted on the central body 34 with providing a rudder pivot axis D3 which is directed across the rotational axis D2.

The displacement body 30 can be formed of a hollow central body 34 and comprises a first end section 31 and a second end section 32. The first end section 31 is joined to the central body 34 and extends therefrom towards the air inlet orifice 11. The second end section 32 is joined to the central body 34 and extends therefrom towards the air inlet orifice 11. The central body 34 comprises an opening 35 at an outer end 32a thereof facing the air outlet orifice 12.

A first vane 50 extends from the central body 34 in a direction across the rotational axis D2. The first vane 50 comprises outer surfaces 51a, 52a which are oriented contrary to each other. Each of the outer surfaces 51a, 52a is formed convex when viewed from the outside of the displacement body 30. Further, the outer surfaces 51a, 52a of the first vane 50 are cambered contrary to each other when viewed in the direction of the extension of the vane 50.

A second vane 60 extends from the central body 34 in a direction across the rotational axis D2. The second vane 60 comprises outer surfaces 61a, 62a which are oriented contrary to each other. Each of the outer surfaces 61a, 62a is formed convex when viewed from the outside of the displacement body 30. Further, the outer surfaces 61a, 62a of the second vane 60 are cambered contrary to each other when viewed in the direction of the extension of the vane 60. The second vane 60 extends towards the inner surface 10a preferably with leaving a relatively small second gap between the outer end of the second vane 60 and the inner surface 10a. The width of this gap is preferably smaller than one fourth of the largest diameter of the housing 10 or the outlet section 18 of the housing 10.

Figure 6:
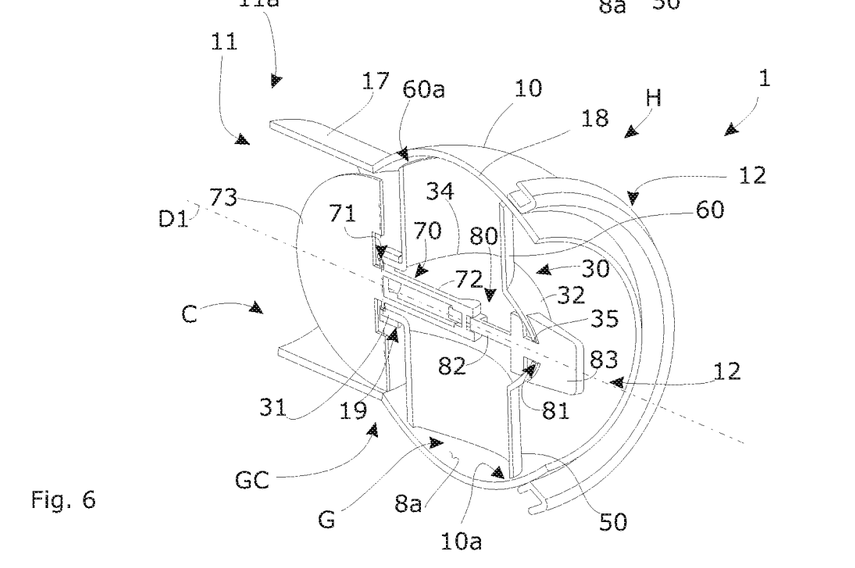
Figure 7:
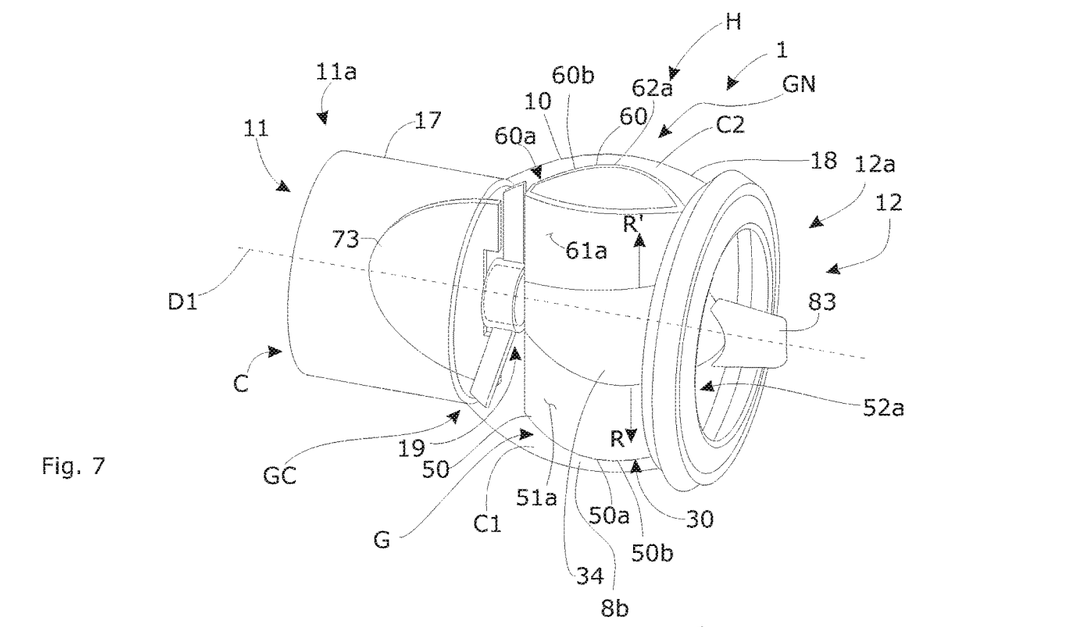

In the case that the first vane 50 and the second vane 60 each have convex outer surfaces 51a, 52a and 61a, 62a, respectively, the outlet section surface 18a can be formed as a concave surface. For example this embodiment is shown in FIG. 6. Thereby, a deceleration of the air flow in the inlet section surface 17a can be avoided or at least diminished.

As an alternative thereto, the first vane 50 and the second vane 60 can be formed as plates.

Particularly in the embodiment in which the outer ends 50a, 60a of the first and second vane 50, 60 each contact the axial surrounding section 8a, the first vane 50 comprises first formation 50b at its outer end and the second vane 60 comprises a second formation 60b at its outer end.

In FIGS. 5 to 10, an embodiment of the adjustment device A is shown. The adjustment device A comprises a first adjustment part 70 rotatably mounted to the central body 34 by a first pivot bearing 71 at the first end section 31 thereof. The first pivot bearing 71 provides a pivot axis D3 which extends across the rotational axis D2. The first adjustment part 70 comprises a rudder 73 extending from the first pivot bearing 71 towards the air inlet orifice 11. Further, the first adjustment part 70 comprises a first coupling lever 72 which is joined to the rudder 73 and which extends towards the outer end 32a of the displacement body 30 facing the air outlet orifice 12. The rudder 73 and the first coupling lever 72 together form a stiff structural component which can be made as one piece.

Further, the outlet device 1 comprises a second adjustment part 80 rotatably mounted to the central body 34 by a second pivot bearing 81 at the second end section 32 thereof which is oriented contrary to the first end section 31 and which is located in a distance from the first end section 31 along the rotational axis D2. The second pivot bearing 81 provides a pivot axis which extends across the rotational axis D2. Preferably, the pivot axis of the second pivot bearing 81 runs parallel to the pivot axis D3 of the first pivot bearing 71. The second adjustment part 80 comprises a handling lever 83 extending from the second pivot bearing 81 through an opening 35 of the central body 34 towards the air outlet orifice 12. Further, the second adjustment part 80 comprises a second coupling lever 82 which is pivotally coupled by a pivot 85 to the first coupling lever 72 with a pivot axis which preferably runs parallel to the first pivot bearing 71 and the second pivot bearing 81. The second coupling lever 82 and the handling lever 83 together form a stiff structural component which can be made as one piece. Thereby the handling lever 83 is pivotally coupled to the rudder 73 and by pivoting the handling lever 83 about the axis of the second pivot bearing 81 the rudder 73 is pivoted.

Figure 8:
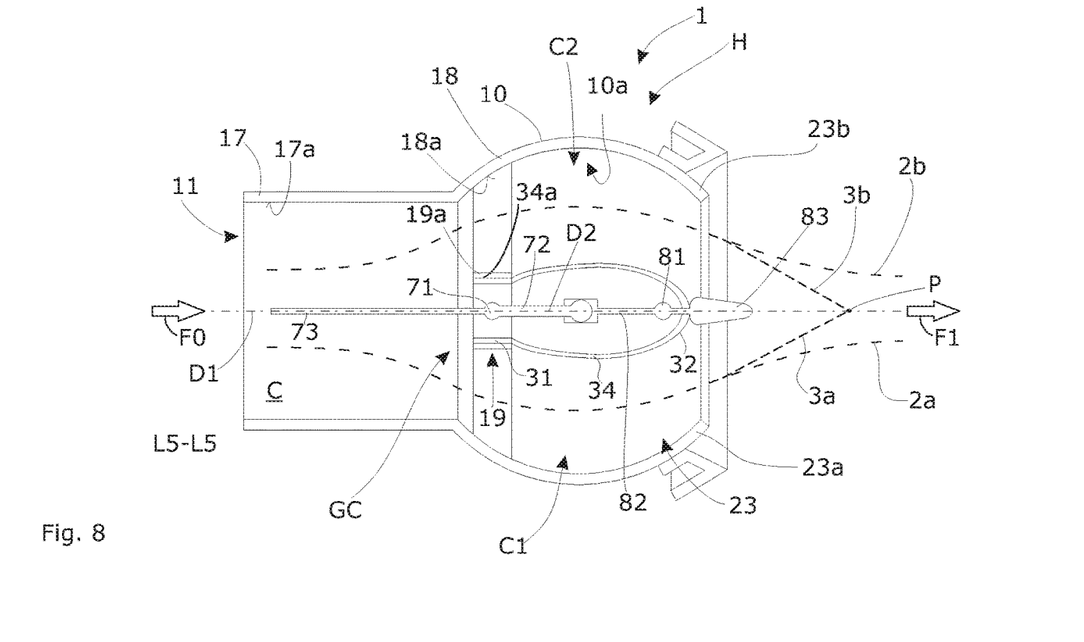

The displacement body 30 in each of its rotational states essentially separates the channel C in a first channel section C1 and a second channel section C2. Accordingly, the displacement body 30 divides the air flow which enters the air inlet orifice 11 essentially in two air flow components, into a first air flow component which flows through the first channel section C1 and a second air flow component which flows through the second channel section C2 (FIG. 8). Preferably, as shown in FIG. 6, in a neutral handling state of the handling lever 83 about the axis of the second pivot bearing 81 the rudder 73 provides the same throughput of air flows in the first channel section C1 and the second channel section C2.

Figure 9:
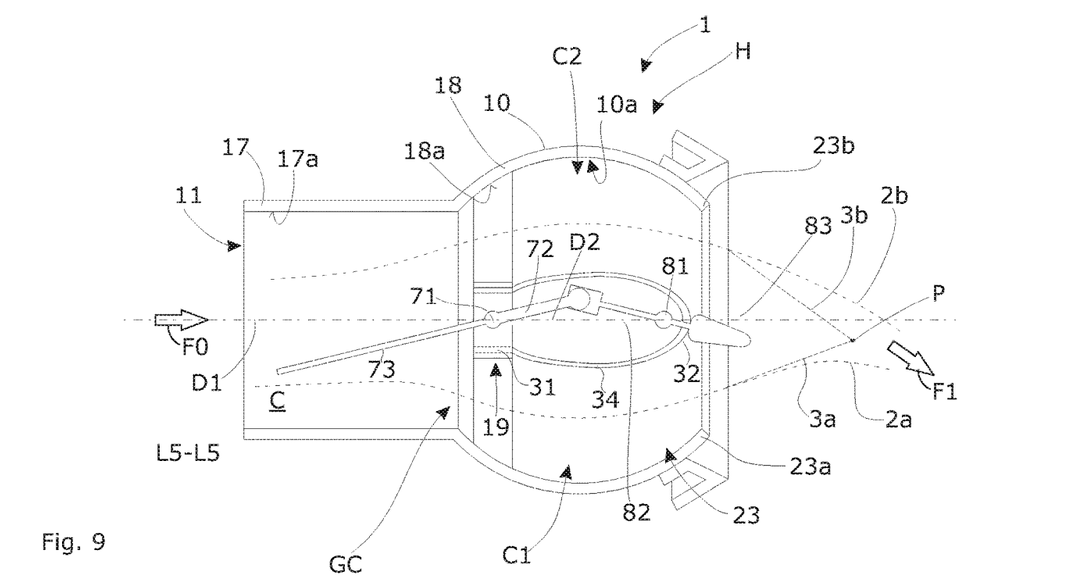
Figure 10:
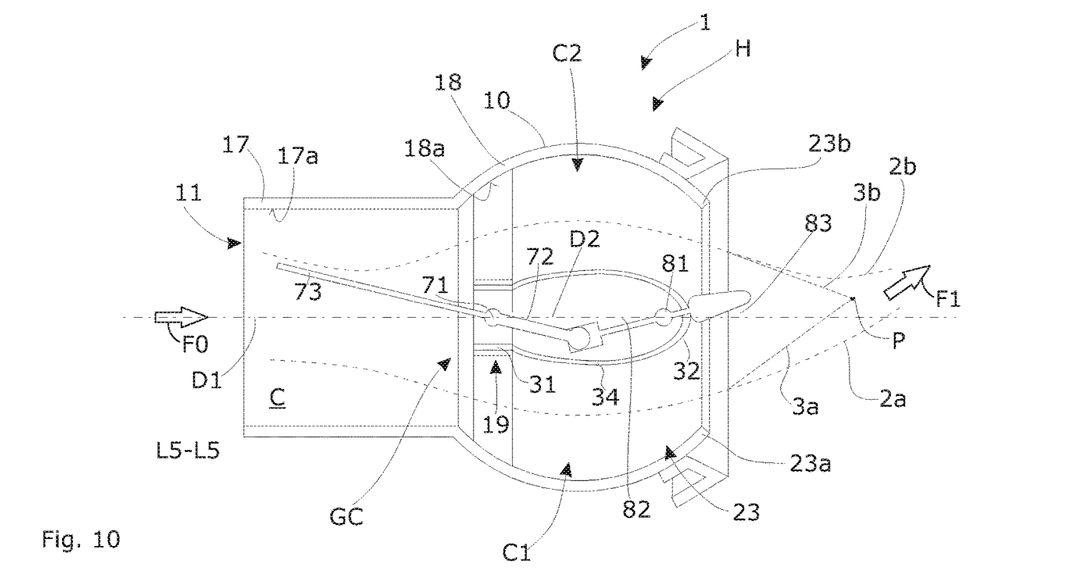

When the rudder 73 is pivoted in a deflected state as shown in FIG. 9, for example into the first channel section C1 when viewed in the rotational axis D2, the throughput of the air flow in the second channel section C2 is increased and the throughput of the air flow in the first channel section C1 is decreased. Thereby, the direction F1 of the discharge air flow is deviated to the side of the first channel section C1 when viewed in the rotational axis D2 (FIG. 9).

In the case of a deflected state of the rudder 73 and by additionally rotating the displacement body 30 about the rotational axis D2, the direction F1 of the discharge air flow is changed, particularly when the deflected state of the rudder 73 remains constant. By this, different orientations of the discharge air flow can be provided in the vehicle interior.

The invention claimed is:

1. Outlet device for ventilation of a vehicle interior by generating an outlet flow, the outlet device comprising:
    a housing with an inner surface forming an outlet section which extends in the direction of a housing axis between an air inlet orifice and an air outlet orifice lying contrary to the air inlet orifice, wherein the inner surface is formed rotationally symmetrical around the housing axis and comprises an axial surrounding section and an end section of the outlet section which forms the air outlet orifice,
    a rotatable displacement body being rotatable around the housing axis, which comprises:
        a central body,
        a first vane which extends from the central body towards the axial surrounding section in a direction of extension,
        a second vane which extends from the central body in a direction contrary to the direction of extension of the first vane and towards axial surrounding section, and
        a rudder which extends towards the air inlet orifice, which is pivotable around a rudder adjustment axis that is parallel to the directions of extension of the first and second vanes,
    a central body guiding device which provides a pivot bearing of the central body with a rotational axis extending along the housing axis,
    an adjustment device coupled to the rudder for pivoting the rudder around the rudder adjustment axis,
    wherein the central body, the first vane and the second vane divide the outlet section into two opposing channel sections directing towards a common intersection point which lies outside the housing.

2. Outlet device according to claim 1, wherein outer ends of each of the first and second vanes contact the axial surrounding section,
    wherein the central body guiding device comprises a first formation at the outer end of the first vane, a second formation at the outer end of the second vane and a surrounding formation formed of the axial surrounding section, wherein the first formation and the second formation each contact the surrounding formation thereby providing the pivot bearing of the central body with the rotational axis.

3. Outlet device according to claim 1, wherein the central body guiding device comprises a pivot bearing device of the central body which is mounted on the housing and located within the outlet section, wherein the pivot bearing device provides the rotational axis extending through the housing from the air inlet orifice to the air outlet orifice.

4. Outlet device according to claim 1, wherein the adjustment device comprises:
    a first adjustment part rotatably mounted to the central body by a first pivot bearing at a first end section thereof, the first adjustment part comprising the rudder extending from the first pivot bearing towards the air inlet orifice and a first coupling lever extending towards an outer end of the displacement body facing the air outlet orifice,
    a second adjustment part rotatably mounted to the central body by a second pivot bearing at a second end section thereof, the second adjustment part comprising a handling lever extending from the second pivot bearing through an opening of the central body towards the air outlet orifice and a second coupling lever which is pivotally coupled with the first coupling lever.

5. According to claim 1, wherein the first vane and the second vane both comprise outer surfaces which are convex when viewed from outside of displacement body, wherein the surfaces of each vane are cambered contrary to each other when viewed in the directions of extension of the vanes.

6. Outlet device according to claim 1, wherein the housing comprises an inlet section with the air inlet orifice and an outlet section which is joined to the inlet section and which comprises the air outlet orifice, wherein the central body is located in the outlet section and wherein the rudder extends into the inlet section.

7. An outlet device for ventilation of a vehicle interior, the outlet device comprising:
    a housing extending along a housing axis between an air inlet orifice and an air outlet orifice, the housing comprising an outlet section and an inner surface that is rotationally symmetric about the housing axis, wherein the outlet section comprises an axial surrounding section and an end section, with the end section forming the air outlet orifice;

a rotatable displacement body configured for rotation about the housing axis, the rotatable displacement body comprising a central body, a first vane extending from the central body in a first direction toward the axial surrounding section, a second vane extending from the central body in a second direction that is opposite the first direction, and a rudder extending toward the air inlet orifice, the rudder being pivotable about a rudder pivot axis that is parallel to said first and second directions;

a central body guiding device comprising a pivot bearing that defines a rotational axis of the central body, the rotational axis being parallel with the housing axis; and an adjustment device coupled with the rudder and configured to pivot the rudder about the rudder pivot axis, wherein the central body, the first vane, and the second vane divide a flow channel of the outlet section into two channel sections on opposite sides of the rotational displacement body, the two channel sections being directed toward an intersection point outside the housing.

8. The outlet device of claim 7, wherein the pivot bearing comprises a first formation at an outer end of the first vane, a second formation at an outer end of the second vane, and a surrounding formation at the axial surrounding section such that the outer ends of the first and second vanes contact the axial surrounding section.

9. The outlet device of claim 7, wherein the pivot bearing is provided by a pivot bearing device mounted on the housing and located within flow the channel, the pivot bearing device comprising a bearing bushing that defines the rotational axis and in which an outer surface of the central body is rotationally received.

10. The outlet device of claim 7, wherein the adjustment device comprises:

a first adjustment part rotatably mounted to a first end section of the central body by a first pivot bearing, the first adjustment part comprising the rudder extending from the first pivot bearing toward the air inlet orifice and a first coupling lever extending from the first pivot bearing and away from the rudder; and a second adjustment part rotatably mounted to a second end section of the central body by a second pivot bearing, the second adjustment part comprising a handling lever extending from the second pivot bearing through an opening of the central body toward the air outlet orifice and a second coupling lever which is pivotally coupled with the first coupling lever.

11. The outlet device according to claim 7, wherein the first vane and the second vane each comprise convex outer surfaces, and wherein the surfaces of each vane are cambered contrary to each other when viewed in the respective first and second directions.

12. The outlet device according to claim 7, wherein the housing comprises an inlet section joined with the outlet section, the inlet section forming the air inlet orifice, and wherein the central body is located in the outlet section and wherein the rudder extends into the inlet section.

* * * * *